Figure 1:
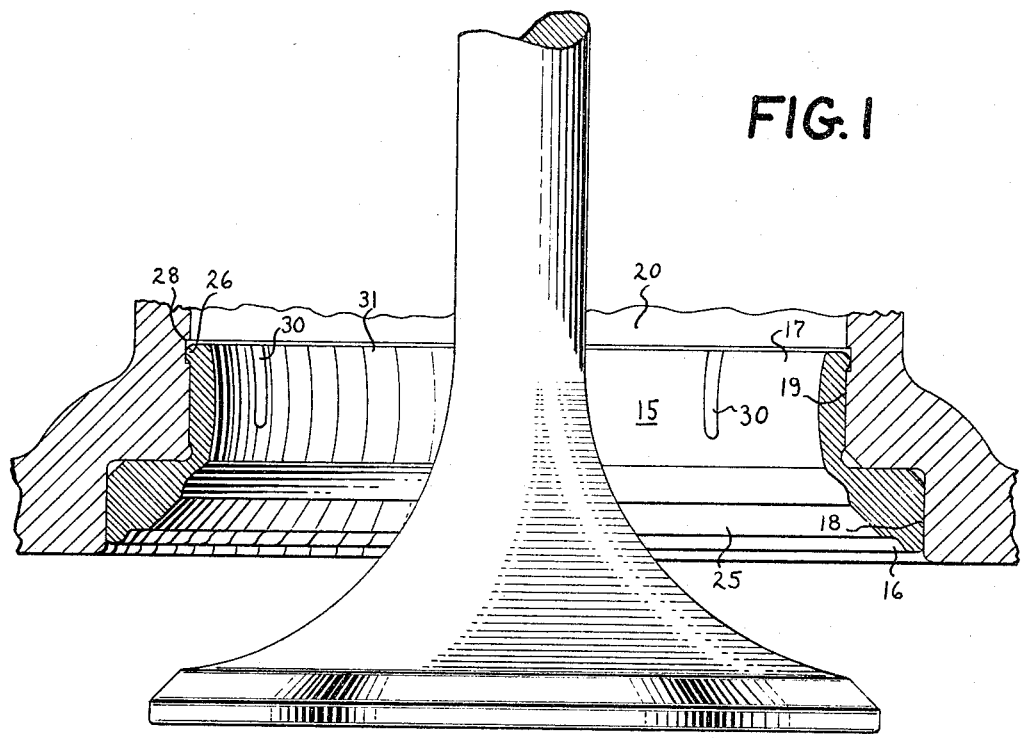

Nov. 15, 1966  H. J. UEBERSCHAER  3,285,235
VALVE SEAT INSERT
Filed Dec. 24, 1964

INVENTOR.
HUBERT J. UEBERSCHAER
HIS ATTORNEY

United States Patent Office 3,285,235
Patented Nov. 15, 1966

3,285,235
VALVE SEAT INSERT
Hubert J. Ueberschaer, Erie, Pa., assignor to General Electric Company, a corporation of New York
Filed Dec. 24, 1964, Ser. No. 421,164
4 Claims. (Cl. 123—188)

This invention relates to valve seat inserts and more particularly to a new and improved self-locking valve seat insert which is retained in position in an engine block or head assembly in spite of the most severe operating conditions to which it may be subjected.

It has long been known that successful performance of a valve seat insert requires that there be intimate contact with the surrounding material of the engine in order to provide for adequate heat transfer between the insert and the engine water jacket. The most common and widely used type of installation is to provide an interference fit, usually an interference fit of 0.001 inch to 0.002 inch per inch of insert diameter. Due to the overload conditions of an engine cylinder, however, the valve seat insert often heats up to such an extent that excessive thermal expansion will cause the material of the valve insert and/or the surrounding material of the engine to overstress and yield permanently. Thereafter, when the engine is being shut down, the valve seat insert cools down and loses its press-or-shrink fit and may fall out of its position in the engine. This can result in broken valves as well as more serious engine damage. Moreover, it has been found that the large interference fit, together with the high stresses due to thermal expansion, causes the counterbore, into which the insert fits, to enlarge to such an extent that a standard size insert cannot be used for replacement.

Attempts have been made in the prior art ot hold such interference fit type valve seat inserts in position by employing separate locking rings which engage annular grooves in the insert and in the counterbore in which the insert fits. While such an arrangement prevents the insert from falling out of position, it has not proven to be an entirely satisfactory solution to the over-all problems. Another prior art attempt at providing a satisfactory valve seat insert involves the use of a valve seat insert which is loose in the counterbore when cold and arranged so that when subjected to the engine operating temperatures the insert expands firmly into contact with the counterbore. Again, this valve seat insert arrangement employs a separate locking ring to prevent the insert falling out of position. While this approach avoids the excessive stressing of the valve seat insert and the surrounding material of the engine, such valve seat inserts have still not been entirely satisfactory. For example, it has been found that the loose fit allows corrosion and carbon deposits to build up at the interface between the insert and the surrounding material to adversely affect heat transfer from the insert to the water jacket.

It is an object of this invention, therefore, to provide a valve seat insert which substantially overcomes one or more of the prior art difficulties.

It is another object of this invention to provide a valve seat insert which maintains intimate contact with the surrounding material at all times and is prevented from falling out of position.

It is still another object of this invention to provide a valve seat insert capable of providing for improved heat transfer between the insert and the water jacket.

Briefly stated, in accordance with one aspect of this invention, a new and improved valve seat insert is provided having, integral therewith, an annular flange of slightly larger outside diameter than the remainder of the insert on which the shoulder is formed which engages an annular groove in the counterbore in which the insert is to be seated; the insert being adapted to seat in said counterbore with at least a line-to-line and no greater than a light interference fit.

In accordance with another aspect of the invention the insert includes a first and second portion of different outside diameters with the annular flange being provided on a portion of smaller outside diameter remote from the valve seat region. This smaller diameter portion is arranged to be sufficiently flexible so that it will temporarily yield to allow for passage of the annular shoulder through the counterbore without unduly increasing the force required to seat the insert in the counterbore.

As used throughout the specification and in the appended claims, the term "light interference fit" means an interference fit of less than 0.001 inch per inch insert diameter.

Figure 2:
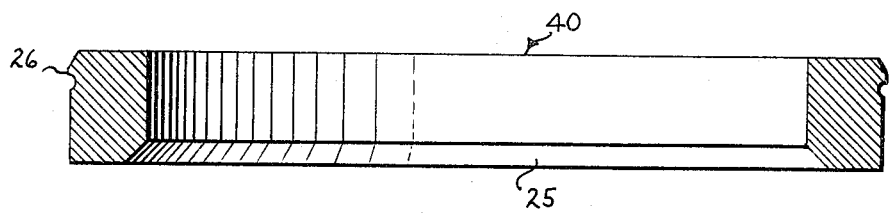

The novel features believed characteristic of the invention are set forth with particularity in the appended claims. The invention itself, however, as to its organization and method of operation, together with further objects and advantages thereof, may best be understood by reference to the accompanying drawings in which:

FIG. 1 is a fragmentary sectional view of a portion of a cylinder head illustrating a valve seat insert in accordance with an embodiment of this invention seated in the counterbore associated with a valve port of the engine; and, FIG. 2 is a cross sectional view of another embodiment of the invention.

As shown in FIG. 1, the valve seat insert, generally designated at 15, is an annular metal ring having a first portion 16 and a second portion 17 adapted to be received into the corresponding portions 18 and 19 of a counterbore associated with the engine valve port, generally designated at 20. The first portion 16 has a valve seat region 25 formed therein and is of a larger outside diameter than the second portion 17.

Both the first and second portions 16 and 17 are adapted to be received into the corresponding portions 18 and 19 of the counterbore with at least a line-to-line and no greater than a light interference fit. With such a fit, the insert 15 is never subjected to overstressing due due to thermal expansion. Also since the insert is always in at least a line-to-line fit with the counterbore, there is always intimate contact between the insert and the surrounding material so that good heat transfer is always provided. Moreover, there is no space between the valve seat insert and the surrounding material to allow corrosion and carbon build-up to impair the heat transfer ability.

To assure that the valve seat insert 15 can never fall out of position, an annular flange 26 is provided on the second portion 17. Annular flange 26 is of slightly larger outside diameter than the remainder of the portion 17 and is adapted to engage the annular groove 28 provided in the portion 19 of the counterbore. The outside diameter of the annular shoulder 26 should be larger than the outside diameter of the portion 17 by no less than about 0.002 inch per inch of diameter of the portion 17. Accordingly, when valve seat insert 15 is seated in the counterbore, the annular flange 26 engages the groove 28 in portion 19 to positively prevent insert 15 from falling out of position even if, for one reason or another, it were to become loose.

To allow for easy installation and removal of insert 15, the second, smaller diameter, portion 17 thereof is provided with a number of slots 30. The slots 30 extend from the end 31 of insert 15 and are directed toward the first portion 16. The slots serve to provide flexibility for the portion 17 so that during insertion of the insert into the counterbore, the portion 17 temporarily yields slightly to allow for passage of the larger diameter annular flange 26 without damage or unduly increasing the force required to seat the insert. When the annular flange 26 is opposite the groove 28, the force acting on annular flange 26 is relieved allowing it to "snap" into engagement with the groove. When the annular flange is engaged in the groove 28, the valve seat insert 15 is positively prevented from falling out of position. The number of slots employed is not critical so long as sufficient flexibility is provided so that the second portion 17 can temporarily yield to allow flange 26 to pass through counterbore portion 19 without breakage and without unduly increasing the force required to install or remove the insert. For example, entirely satisfactory results have been obtained with as many as 10 or 12 and as few as two such slots. Also, depending upon the material employed and the wall thickness of the second portion 17, sufficient flexibility may be present without employing any slots whatever.

From the foregoing description it is readily apparent that the valve seat insert 15 does not depend upon an interference fit with the surrounding material to remain in position. Instead the insert has its own locking means integral therewith in the form of the annular flange, or lip, 26 which engages annular groove 28 in the surrounding material of the counterbore. The locking ability of the valve seat insert of FIG. 1 is so effective, for example, that removal of a specific insert, installed in the counterbore with only a line-to-line fit, required a force of about 200 pounds. Moreover, removal and installation of such valve seat inserts can be accomplished easily and without danger of any damage whatsoever to the counterbore or the edges of the annular groove provided therein.

Also, the configuration of the valve seat insert shown in FIG. 1, having the first and second portions of different outside diameters, makes it possible to reduce the distance between the valve seat region 25 and the cooling surface on the water side to thereby reduce the valve seat temperature considerably as compared to a conventional single diameter solid type insert. This serves to extend the operating life of both the insert and the valve associated therewith.

Referring now to FIG. 2, there is shown a solid-type valve seat insert which in many respects is quite similar to that conventionally employed for high interference installations. As shown, insert 40 has a valve seat region 25 formed in one end thereof in the usual manner. The other end of the insert 40 is provided with the annular flanges 26 which, as described hereinbefore with respect to FIG. 1, is adapted to engage an annular groove provided in the counterbore in which insert 40 is received. As in the embodiment of FIG. 1, the annular flange 26 has an outside diameter slightly larger than that of the remainder of the insert. Specifically, the outside diameter of annular flange 26 should be larger than the outside diameter of the remainder of the insert by no less than about 0.002 inch per inch of insert diameter. The outside diameter of the major portion of insert 40 is chosen so that it will be received in its counterbore with at least a line-to-line and no greater than a light interference fit.

In the foregoing specification, only two specific embodiments of the valve seat insert of this invention have been shown and described in detail. From this description it will be apparent that the invention may be incorporated into valve seat inserts having various different forms and sizes. It will be apparent to those skilled in the art, therefore, that the illustrated embodiments of the invention are examples only and that many changes and modifications may be made without departing from the invention. It is the aim, therefore, in the appended claims to cover all such changes and modifications as fall within the true spirit and scope of the invention.

What I claim as new and desire to secure by Letters Patent of the United States is:

1. A valve seat insert for an internal combustion engine comprising: a cylindrical metal ring having a valve seat formed in one end thereof, said cylindrical metal ring being adapted to be seated into a counterbore of an engine valve port with at least a line-to-line and no greater than a light interference fit; and an integral annular flange proximate the end of said ring remote from said valve seat and having an outside diameter greater than the inside diameter of said counterbore with which it is associated so that said flange after being forced through said counterbore is adapted to engage an annular groove in the base of said counterbore to prevent said ring from falling out of its position while allowing for the non-destructive removal thereof from said counterbore.

2. The valve seat insert of claim 1 wherein the outside diameter of said annular flange is larger than the remainder of said insert on which it is located by no less than 0.002 inch per inch of insert diameter.

3. A valve seat insert for an internal combustion engine comprising: a cylindrical metal ring including a first cylindrical portion having a larger outside diameter than a second cylindrical portion, said cylindrical metal ring being adapted to be seated into the corresponding first and second portions of a counterbore associated with the valve port of an engine with at least a line-to-line and no greater than a light interference fit; and an annular flange at the end of said second portion having an outside diameter greater than the inside diameter of the second portion of said counterbore so that said flange after being forced through the second portion of said counterbore is adapted to engage an annular groove in the base of the second portion of said counterbore to lock said valve seat insert in position while allowing for the non-destructive removal thereof from said counterbore.

4. The valve seat insert of claim 3 wherein the outside diameter of said annular flange is larger than the outside diameter of said second portion by no less than 0.002 inch per inch of diameter of said second portion.

References Cited by the Examiner

UNITED STATES PATENTS

| | | | |
|---|---|---|---|
| 1,569,245 | 1/1926 | Willgoos | 123—188 |
| 2,007,543 | 7/1935 | Meeker | 123—188 |
| 2,035,165 | 3/1936 | Jardine | 123—118 |
| 2,696,810 | 12/1954 | Kuepfer | 123—188 |

FOREIGN PATENTS 762,579  10/1954  Germany.

MARK NEWMAN, *Primary Examiner.*

AL LAWRENCE SMITH, *Examiner.*

UNITED STATES PATENT OFFICE
CERTIFICATE OF CORRECTION

Patent No. 3,285,235　　　　　　　　　　　　November 15, 1966

Hubert J. Ueberschaer

It is hereby certified that error appears in the above numbered patent requiring correction and that the said Letters Patent should read as corrected below.

Column 4, line 38, before "end" insert -- free --.

Signed and sealed this 12th day of September 1967.

(SEAL)
Attest:

ERNEST W. SWIDER　　　　　　　　　　　　EDWARD J. BRENNER
Attesting Officer　　　　　　　　　　　　　Commissioner of Patents